United States Patent [19]

Siler, III

[11] Patent Number: 5,343,684
[45] Date of Patent: Sep. 6, 1994

[54] RAKE ATTACHMENT

[76] Inventor: John R. Siler, III, 707 Armstrong Dr., Belmont, N.C. 28012

[21] Appl. No.: 46,615

[22] Filed: Apr. 14, 1993

[51] Int. Cl.$^5$ ............................................. A01D 7/10
[52] U.S. Cl. .................... 56/400.08; 56/400.16; 172/375
[58] Field of Search .......... 56/400.08, 400.16, 400.01, 56/400.04; 172/375, 378, 374

[56] References Cited

U.S. PATENT DOCUMENTS

| | | |
|---|---|---|
| 157,439 | 12/1874 | Brinckerhoff . |
| 1,126,273 | 1/1915 | Restetsky . |
| 1,131,553 | 3/1915 | Rethorn . |
| 1,136,770 | 4/1915 | Brewer . |
| 1,137,825 | 5/1915 | Wright . |
| 1,159,970 | 11/1915 | Lund . |
| 1,715,613 | 6/1929 | McFadden . |
| 2,010,325 | 8/1935 | Sawyer . |
| 2,099,053 | 11/1937 | Donnan . |
| 2,114,518 | 4/1938 | Bayliss . |
| 2,140,911 | 12/1938 | James . |
| 2,713,763 | 7/1955 | Holman et al. . |
| 2,797,544 | 7/1957 | Fite . |
| 3,264,810 | 8/1966 | Lowell . |
| 3,367,093 | 2/1968 | Zwickel . |
| 3,397,469 | 8/1968 | Browning . |
| 3,884,023 | 5/1975 | Robinson ........................... 56/400.1 |
| 4,203,495 | 5/1980 | Crownover ..................... 172/375 X |
| 4,292,794 | 10/1981 | Gascon ............................ 56/400.16 |
| 4,476,939 | 10/1984 | Wallace .......................... 172/375 X |
| 4,606,089 | 8/1986 | King .............................. 56/400.04 X |
| 4,667,461 | 5/1987 | Forbes ............................ 56/400.15 |
| 4,776,158 | 10/1988 | Baum ............................. 56/400.08 |
| 4,850,185 | 7/1989 | Dimon ............................. 56/400.1 |
| 4,866,922 | 9/1989 | Clark .............................. 56/400.04 |
| 5,185,992 | 2/1993 | Garcia ............................ 56/400.04 |

Primary Examiner—Terry Lee Melius
Attorney, Agent, or Firm—Bell, Seltzer, Park & Gibson

[57] ABSTRACT

A rake attachment for cleaning the tines of a hand rake includes a header and a plurality of tines connected thereto. The tines are substantially rigid and are adapted to engage the tines of the rake and clean accumulated leaves and debris therefrom. A plurality of clips is attached to the header of the rake attachment so that it can be removably mounted on the header of the rake. The rake attachment can also be used as an auxiliary hand rake for raking in confined spaces. In addition, an alternative embodiment has a handle connected to the rake attachment.

21 Claims, 1 Drawing Sheet

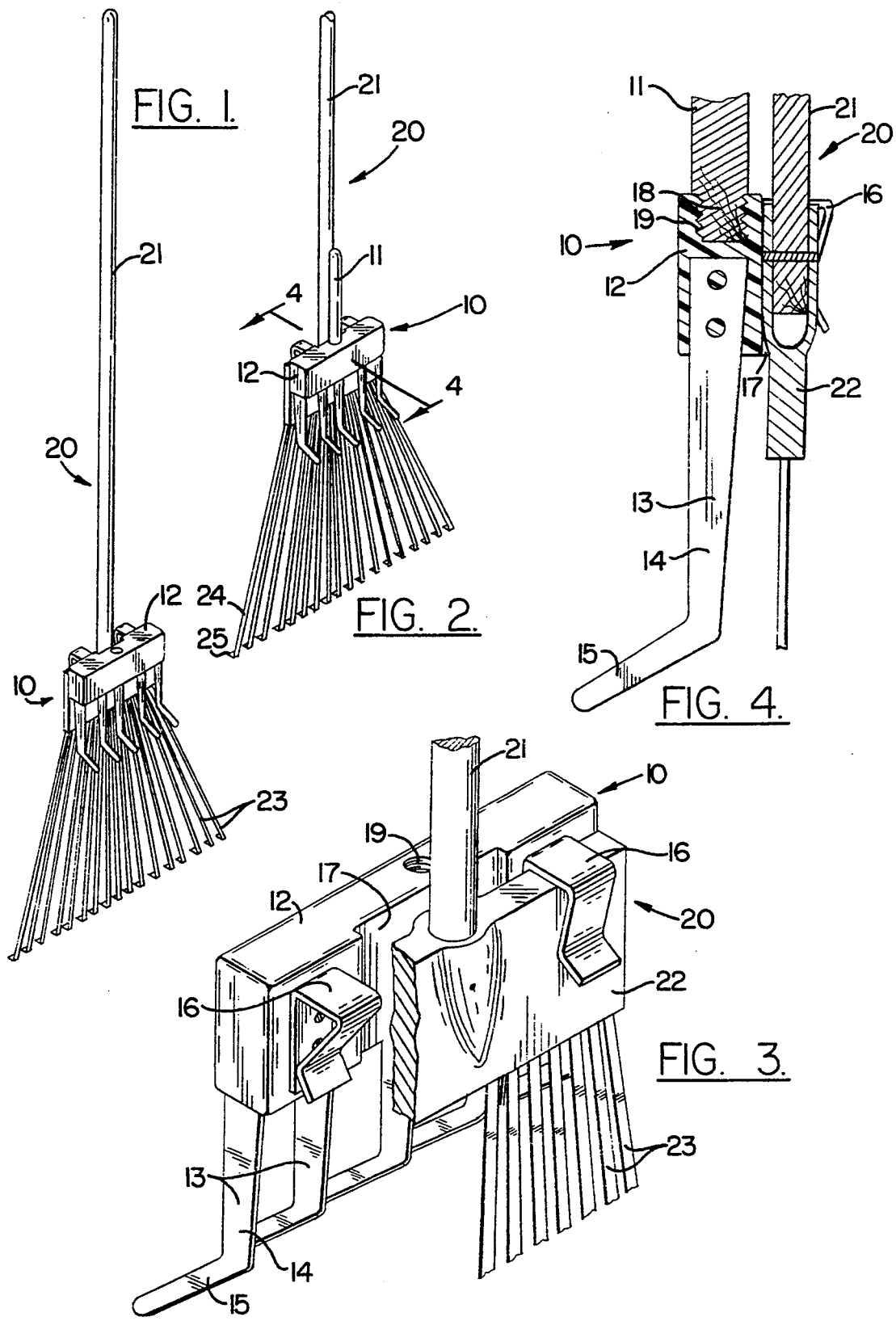

RAKE ATTACHMENT

FIELD OF THE INVENTION

This invention relates to hand tools and more particularly to hand rakes and attachments thereto.

BACKGROUND OF THE INVENTION

A hand rake is used to aid in the clean up and removal of leaves, grass clippings, sticks and other debris from yards and lawns and other areas around a home. In the course of raking, however, the leaves or debris may become lodged in the tines of the rake. As the leaves and debris further accumulate in the tines of the rake, the raking action of the tines will become obstructed, thereby preventing effective use of the rake. The user must then reach down and manually remove the debris from the rake tines. Such manual removal is not only frustrating and time consuming, but may also cause injury to the fingers and hands of the user if prolonged and repetitive.

Self cleaning rakes have long been known in the prior art. See, for example, U.S. Pat. No. 4,850,185 to Dimon and U.S. Pat. No. 3,884,023 to Robinson. Such self cleaning rakes typically include a slider bar positioned on the rake so that the tines of the rake extend therethrough, and a means for remotely moving the slider bar along the tines of the rake so that debris will be removed therefrom. The slider bar and associated moving means are fixedly secured to the rake and, as such, may not be adaptable to be retrofitted to a standard rake. Furthermore, even if conventional rake cleaning devices can be retrofitted to a standard rake, substantial modification of the rake may be necessary. In addition, the self cleaning device adds considerable weight to the rake which makes it more difficult and tiresome to use.

In addition to the removal of leaves and debris from yards and lawns and other open areas around a home, it is also desirable to remove leaves, debris, etc. from relatively confined places. For example, leaves may accumulate between closely spaced bushes or shrubs and between such shrubs and the wall of an adjacent structure. Conventional rakes have a relatively broad raking span, however, making it difficult, if not impossible, to effectively rake in such confined spaces.

It is therefore an object of the present invention to provide an apparatus for improved cleaning of hand rake tines.

Yet another object of the present invention is to provide an apparatus for cleaning rake tines that can be easily attached to a standard rake and that will not add excessive weight to the rake.

Still another object of the present invention is to provide an apparatus for cleaning the tines of the rake that can also be used as an auxiliary hand rake in confined spaces.

SUMMARY OF THE INVENTION

These and other objects and advantages of the present invention are achieved in the embodiments illustrated herein by the provision of an apparatus which comprises a rake attachment removably mounted on a hand rake.

The hand rake is a typical yard rake that has an elongate handle for being manually grasped by the user. A header is connected to one end of the handle and a plurality of flexible tines are connected to the header. The tines are arranged in a spaced apart diverging relation and extend in a general direction away from the header. Each of the tines is formed of relatively flexible material.

The rake attachment has a header and a plurality of spaced apart rake attachment tines connected thereto and extending therefrom. Each of the rake attachment tines has a substantially straight body portion and an offset free end and is substantially rigid. The rake attachment tines have a greater width than thickness and are arranged non-coplanar but parallel to each other in the widthwise direction.

A plurality of resilient clips is connected to the header of the rake attachment for removably mounting the rake attachment on the header of the hand rake. In operation, the rake attachment is mounted to the header of the hand rake while raking and, when the tines of the rake require cleaning, the user removes the rake attachment with one hand and engages the tines of the rake attachment with the tines of the rake. Thus, the rake attachment provides an effective means for removing leaves and debris from the tines of the rake and can be easily attached to and carried by the rake.

The rake attachment can also be removed from the rake for use as an auxiliary rake in confined spaces of the type mentioned above. In addition, an alternative embodiment has a relatively short handle removably connected to the header of the rake attachment for the user's convenience while cleaning the tines of the rake or while raking in confined spaces.

BRIEF DESCRIPTION OF THE DRAWINGS

Some of the objects and advantages of the present invention having been stated others will appear as the description proceeds when taken in conjunction with the accompanying drawings.

FIG. 1 is a perspective view of the rake attachment of the present invention mounted on the header of a hand rake.

FIG. 2 is a perspective view of an alternative embodiment of the rake attachment of the present invention shown with a connected handle.

FIG. 3 is an enlarged view of the rake attachment of the present invention including a fragmentary view of the rake.

FIG. 4 is a sectional elevation view taken substantially along the line 4—4 in FIG. 2.

DETAILED DESCRIPTION OF A PREFERRED EMBODIMENT

The present invention will now be described more fully hereinafter with reference to the accompanying drawings in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring more particularly to the drawings, FIG. 1 illustrates a hand rake 20 with the rake attachment 10 of the present invention attached thereto. The hand rake has a relatively long handle 21 for being grasped by the user with both hands. A header 22 is connected to one end of the handle and a plurality of flexible tines 23 are connected to the header.

Many embodiments of rake headers are commercially available; for example, the header may be a square or rectangular box section that is formed of plastic and which is integrally formed with the flexible tines. The header may also be a triangular plastic shroud that covers the proximal end of the tines and is not connected to the tines other than at the point at which the tines converge and connect to the handle of the rake. The header of the rake may also comprise two generally parallel flat pieces of steel or plastic wherein the lower end of one of the pieces further extends to form the tines. In the illustrated embodiment, a rectangular header 22 is shown with an enlarged central portion to accommodate the handle 21 of the rake.

The tines 23 are arranged in a spaced apart diverging relationship and extend in a general direction away from the header to form a rake span at the free ends 25 of the tines that is larger than the width of the header. Each of the tines 23 has a substantially straight body portion 24 and a free end 25 that is offset so that the tines contact the ground at the proper raking angle. The tines 23 are formed of a relatively flexible material, such as plastic or spring steel, so that when an individual tine comes into contact with a high spot in the path of the rake, such as a tuft of grass, that tine will flex upward and the rest of the tines can remain in contact with the underlying surface. The tines have a greater width than thickness and are arranged widthwise to each other so that the body portions 24 are substantially coplanar in the widthwise direction. This orientation of the tines further enhances their flexibility.

The rake attachment 10 of the present invention includes a header 12 of rectangular, plastic construction that securely supports a plurality of tines 13 molded therein. The size and shape of the header 12 allow it to be easily and comfortably grasped by the user with one hand.

The tines 13 of the rake attachment 10 extend from the header 12 in a spaced apart relationship. The tines have a substantially straight body portion 14 and a free end 15 that is offset so that the tines contact the ground at the proper raking angle when the rake attachment is used as an auxiliary hand rake for raking in confined spaces. The tines 13 also have a greater width than thickness and are arranged non-coplanar but parallel to each other in the widthwise direction.

The thickness of each tine 13 of the rake attachment is smaller than the space between adjacent tines 23 of the rake so that the rake attachment tines can fit between the rake tines. The tines 13 are formed of a light but substantially rigid material, such as aluminum, so that they will effectively remove accumulated leaves and debris from the tines 23 of the rake when engaged therewith. Furthermore, the space between adjacent tines 13 of the rake attachment is larger than the distance between the opposite edges of two adjacent rake tines 23. Thus, because two or more tines 23 of the rake can be accommodated by adjacent rake attachment tines 13 when engaged therewith, the less than one-to-one ratio of attachment tines to rake tines results in a significant weight savings for the rake attachment.

A plurality of resilient clips 16 is connected to the header 12 of the rake attachment for removably mounting the rake attachment on the header 22 of the rake. In the illustrated embodiment, two clips 16, that when viewed in cross section resemble the letter "R", are securely mounted to the header of the rake attachment. The clips 16 allow the rake attachment to be mounted to rakes of various header types, including the types discussed above, and a recess 17 formed in the section of the header between the clips is adapted to accommodate rake headers with enlarged central portions, as illustrated in FIG. 3.

In operation, the rake attachment is mounted on the header 22 of the rake and the user rakes in the conventional manner. The clips 16 are positioned on the rake attachment so that the offset free ends 25 of the rake attachment tines extend in a direction away from the rake 20 and do not interfere with the tines 23 of the rake when mounted thereon. As shown in FIGS. 1 and 2, the rake attachment 10 is mounted on the side of the rake opposite the offset free ends 25 of the tines of the rake, although it would be readily understood by one of ordinary skill in the art that the rake attachment could also be mounted on the other side of the rake.

When the tines of the rake require cleaning, the user holds the rake with one hand, removes the rake attachment with the other hand, and engages the tines 13 of the rake attachment with the tines 23 of the rake. A few strokes of the rake attachment will remove all leaves and debris from the tines of the rake. Thus, the rake attachment provides an effective means for cleaning the rake tines and can be easily attached to and carried by the hand rake.

In an alternative embodiment, an elongate handle 11 is removably connected to the rake attachment by means of threaded portion 18 at one end of the handle and a corresponding threaded hole 19 in the header 12, as shown in FIGS. 2 and 4. The handle 11 is of relatively short length, as compared to the length of the handle 21 of the rake, and can be easily grasped and used by the user with only one hand. The user may find it more convenient to hold and use the rake attachment with a handle connected thereto.

In addition, the span of the rake tines is relatively broad and inhibits the ability of the rake to reach into confined spaces. The rake attachment 10 can also be removed from the rake 20 for use as a small auxiliary rake for raking in confined spaces of the type mentioned above.

That which is claimed is:

1. A hand rake having an elongated handle for being manually grasped by the user, a header connected to one end of said handle, a plurality of flexible tines connected to said header with said tines arranged in spaced apart diverging relation and extending in a general direction away from said header, the combination therewith of a rake attachment removably mounted on said rake and being of much smaller size for ready accessibility for use in cleaning the tines of said rake of debris such as leaves and the like and for use as an auxiliary hand rake in confined spaces such as between closely spaced plants, said rake attachment comprising a header adapted for being hand held or connected to one end of a handle, a plurality of spaced apart tines connected to said header of said rake attachment, and means connected to said header of said rake attachment for removably mounting said rake attachment on said header of said rake.

2. A hand rake as claimed in claim 1 wherein each of said tines of said rake has a substantially straight body portion and an offset free end, said tines of said rake being formed of a relatively flexible material having a greater width than thickness, and being arranged widthwise to each other and having said body portions substantially coplanar in the widthwise direction.

3. A hand rake as claimed in claim 1 wherein each of said tines of said rake attachment has a substantially straight body portion and an offset free end, each of said tines of said rake attachment being substantially rigid and having a greater width than thickness and being arranged parallel and non-coplanar to each other in the widthwise direction.

4. A hand rake as claimed in claim 1 wherein said means for removably mounting said rake attachment on said rake comprises a plurality of resilient clips connected to said header of said rake attachment.

5. A hand rake as claimed in claim 1 wherein said rake attachment further comprises a relatively short handle, said handle having a threaded end portion and said header of said rake attachment having a corresponding threaded hole whereby said handle is removably connected to said header of said rake attachment.

6. A hand rake as claimed in claim 1 wherein the distance between each of said plurality of spaced apart tines of said rake attachment is sufficiently large to accommodate two or more tines of said rake when said rake attachment is engaged with said rake for cleaning the tines of said rake of debris.

7. A hand rake as claimed in claim 1 wherein, when said rake attachment is mounted on said header of said rake by said means connected to said header of said rake attachment, said offset free ends of said tines of said rake attachment extend in a general direction away from said rake.

8. A hand rake having an elongated handle for being manually grasped by the user, a header connected to one end of said handle, a plurality of flexible tines connected to said header with said tines arranged in spaced apart diverging relation and extending in a general direction away from said header, each of said tines having a substantially straight body portion and an offset free end, each of said tines being formed of relatively flexible material having a greater width than thickness, said tines being arranged widthwise to each other and having said body portions substantially coplanar in the widthwise direction, the combination therewith of a rake attachment removably mounted on said rake and being of much smaller size for ready accessibility for use in cleaning the tines of said rake of debris such as leaves and the like and for use as an auxiliary hand rake in confined spaces such as between closely spaced plants, said rake attachment comprising a header adapted for being hand held or connected to one end of a handle, a plurality of spaced apart tines connected to said header of said rake attachment, each of said tines of said rake attachment having a substantially straight body portion and an offset free end, each of said tines being substantially rigid and having a greater width than thickness and being arranged parallel and non-coplanar to each other in the widthwise direction, and means connected to said header of said rake attachment for removably mounting said rake attachment on said header of said rake.

9. A hand rake as claimed in claim 8 wherein said means for removably mounting said rake attachment on said rake comprises a plurality of resilient clips connected to said header of said rake attachment.

10. A hand rake as claimed in claim 8 wherein said rake attachment further comprises a relatively short handle, said handle having a threaded end portion and said header of said rake attachment having a corresponding threaded hole whereby said handle is removably connected to said header of said rake attachment.

11. A hand rake as claimed in claim 8 wherein the distance between each of said plurality of spaced apart tines of said rake attachment is sufficiently large to accommodate two or more tines of said rake when said rake attachment is engaged with said rake for cleaning the tines of said rake of debris.

12. A hand rake as claimed in claim 8 wherein, when said rake attachment is mounted on said header of said rake by said means connected to said header of said rake attachment, said offset free ends of said tines of said rake attachment extend in a general direction away from said rake.

13. A hand rake having an elongated handle for being manually grasped by the user, a header connected to one end of said handle, a plurality of flexible tines connected to said header with said tines arranged in spaced apart diverging relation and extending in a general direction away from said header, each of said tines having a substantially straight body portion and an offset free end, the combination therewith of a rake attachment removably mounted on said rake and being of much smaller size for ready accessibility for use in cleaning the tines of said rake of debris such as leaves and the like and for use as an auxiliary hand rake in confined spaces such as between closely spaced plants, said rake attachment comprising a header adapted for being hand held or having a handle removably affixed thereto, a plurality of spaced apart tines connected to said header of said rake attachment, each of said tines of said rake attachment having a substantially straight body portion and an offset free end, and means connected to said header of said rake attachment for removably mounting said rake attachment on said header of said rake whereby, when said rake attachment is so mounted, said offset free ends of said tines of said rake attachment extend in a general direction away from said rake.

14. A hand rake as claimed in claim 13 wherein said means for removably mounting said rake attachment on said rake comprises a plurality of resilient clips connected to said header of said rake attachment.

15. A hand rake as claimed in claim 13 wherein said rake attachment further comprises a relatively short handle, said handle having a threaded end portion and said header of said rake attachment having a corresponding threaded hole whereby said handle is removably connected to said header of said rake attachment.

16. A hand rake as claimed in claim 13 wherein the distance between each of said plurality of spaced apart tines of said rake attachment is sufficiently large to accommodate two or more tines of said rake when said rake attachment is engaged with said rake for cleaning the tines of said rake of debris.

17. A rake attachment for being removably mounted on a rake and for ready accessibility for use in cleaning the tines of the rake of debris such as leaves and the like and for use as an auxiliary hand rake in confined spaces such as between closely spaced plants, said rake attachment comprising a header adapted for being hand held or connected to one end of a handle, a plurality of spaced apart tines connected to said header, and means connected to said header for removably mounting said rake attachment to a rake.

18. A rake attachment as claimed in claim 17 wherein each of said tines of said rake attachment has a substantially straight body portion and an offset free end, each of said tines of said rake attachment being substantially rigid and having a greater width than thickness and being arranged parallel and non-coplanar to each other in the widthwise direction.

19. A rake attachment as claimed in claim 17 wherein said means for removably mounting said rake attachment on a rake comprises a plurality of resilient clips connected to said header of said rake attachment.

20. A rake attachment as claimed in claim 17 further comprising a relatively short handle, said handle having a threaded end portion and said header of said rake attachment having a corresponding threaded hole whereby said handle is removably connected to said header.

21. A rake attachment as claimed in claim 17 wherein the distance between each of said plurality of spaced apart tines of said rake attachment is sufficiently large to accommodate two or more tines of a rake when said rake attachment is engaged with the rake for cleaning the tines of the rake of debris.

* * * * *